US012216666B2

(12) United States Patent
Kiperwasser

(10) Patent No.: US 12,216,666 B2
(45) Date of Patent: Feb. 4, 2025

(54) PERSONALIZED RECENCY AND TIME-AWARE SYSTEM

(71) Applicant: eBay Inc., San Jose, CA (US)

(72) Inventor: Eliyahu Kiperwasser, Qiryat Ono (IL)

(73) Assignee: eBay Inc., San Jose, CA (US)

( * ) Notice: Subject to any disclaimer, the term of this patent is extended or adjusted under 35 U.S.C. 154(b) by 67 days.

(21) Appl. No.: 17/870,511

(22) Filed: Jul. 21, 2022

(65) Prior Publication Data

US 2024/0028600 A1 Jan. 25, 2024

(51) Int. Cl.
*G06F 7/00* (2006.01)
*G06F 16/2457* (2019.01)
*G06N 20/00* (2019.01)

(52) U.S. Cl.
CPC ....... *G06F 16/24578* (2019.01); *G06N 20/00* (2019.01)

(58) Field of Classification Search
CPC .......................... G06F 16/24587; G06N 20/00
USPC .................................................. 707/600–899
See application file for complete search history.

(56) References Cited

U.S. PATENT DOCUMENTS

| | | |
|---|---|---|
| 10,706,450 B1 | 7/2020 | Tavernier |
| 11,120,218 B2 | 9/2021 | Ray |
| 2017/0200204 A1 | 7/2017 | Bostick et al. |
| 2018/0047071 A1 | 2/2018 | Hsu et al. |
| 2020/0005219 A1* | 1/2020 | Stevens ..................... G06F 8/71 |
| 2020/0020000 A1 | 1/2020 | Guy et al. |
| 2021/0012406 A1 | 1/2021 | Wadhwa et al. |
| 2021/0150593 A1 | 5/2021 | Ghorbani et al. |
| 2022/0058489 A1 | 2/2022 | Volkovs et al. |
| 2022/0122134 A1 | 4/2022 | Hoffman et al. |
| 2022/0385689 A1* | 12/2022 | Rajasekharan ........ G06N 3/044 |

OTHER PUBLICATIONS

Bi et al., "Learning a Fine-Grained Review-based Transformer Model for Personalized Product Search", In Proceedings of the 44th International ACM SIGIR Conference on Research and Development in Information Retrieval (SIGIR 21), Jul. 11-15, 2021, Virtual Event, Canada. ACM, New York, NY, USA. Available online at: <https://doi.org/10.1145/3404835.3462911>, Jun. 3, 2021, 10 pages.
Chunli et al., "Aspect-Based Personalized Review Ranking", 2018 IEEE SmartWorld, Guangzhou, China, 2018, pp. 1329-1334.

(Continued)

*Primary Examiner* — Isaac M Woo
(74) *Attorney, Agent, or Firm* — Shook, Hardy & Bacon L.L.P.

(57) ABSTRACT

Systems, methods, and computer-storage media provide content item retrieval that is personalized and time aware for a user. Interaction tracking is performed to identify content items with which the user has interacted and time data indicative of when the user interacted with each content item. A machine learning model is trained using the content items and the time data associated with each content item. Once trained, the machine learning model is used to generate a relevance score for each of a number of target content items. At least a portion of the target content items are provided for presentation to the user based on the relevance scores.

20 Claims, 6 Drawing Sheets

(56) References Cited

OTHER PUBLICATIONS

Dash et al., "Personalized Ranking of Online Reviews Based on Consumer Preferences in Product Features", International Journal of Electronic Commerce, 25:1, 29-50, DOI: 10.1080/10864415.2021.1846852. Available online at: <https://doi.org/10.1080/10864415.2021.1846852>, Jan. 4, 2021, 23 pages.

Huang et al., "Personalized Review Recommendation based on Users' Aspect Sentiment", ACM Trans. Internet Technol. 20, 4, Article 42, Available online at: <https://doi.org/10.1145/3414841>, Oct. 2020, 26 pages.

Krestel et al., "Diversifying Product Review Rankings: Getting the Full Picture", 2011 IEEE/WIC/ACM International Conferences on Web Intelligence and Intelligent Agent Technology, 2011, pp. 138-145.

Samha et al., "Aspect-Based Opinion Extraction From Customer Reviews", School of Electrical Engineering and Computer Science, Queensland University of Technology, Brisbane, Australia, 2014, pp. 149-160.

Saumya et al., "Ranking Online Consumer Reviews", Electronic Commerce Research and Applications 29 DOI:10.1016/j.elerap.2018.03.008, 2018, pp. 1-38.

Wang et al., "User-Personalized Review Rating Prediction Method Based on Review Text Content and User-Item Rating Matrix", Information 2019, 10(1), 1; Available online at: <https://doi.org/10.3390/info10010001>, Dec. 20, 2018, pp. 1-15.

Extended European Search Report received for European Patent Application No. 23185213.8, mailed on Nov. 8, 2023, 9 Pages.

\* cited by examiner

| CONTENT ITEM 202 | INTERACTION TYPE 204 | INTERACTION TIME 206 | CATEGORY 208 |
|---|---|---|---|
| THIS PHONE ... | MARKED HELPFUL | 05/30/2021 | MOBILE DEVICE |
| BRIGHT SCREEN ... | MARKED HELPFUL | 09/23/2021 | TELEVISION |
| DON'T BUY ... | VIEWED | 11/05/2021 | MOBILE DEVICE |
| THE CAMERA TAKES GREAT ... | MARKED HELPFUL | 3/25/2022 | MOBILE DEVICE |
| THIS TELEVISION ... | VIEWED | 6/21/2022 | TELEVISION |
| ... | | | |

*FIG. 2.*

PERSONALIZED RECENCY AND TIME-AWARE SYSTEM

BACKGROUND

The Internet provides users access to a vast amount of content. While some content items are relevant to any given user, the majority is not. As a result, content item retrieval is a particular Internet-centric problem that has proven to be difficult to address. That is, given a large number of content items, what content items should be retrieved and presented to a user and in what order. Take user reviews as an illustrative example. A wide range of systems provide the ability for users to submit user reviews for products, services, restaurants, and the like. While some of the user reviews are helpful, many are not. Additionally, what is helpful to one user is not helpful to another since different users can have different aspects that are important to them. As another illustrative example, digital streaming services (e.g., movies, videos, music, etc.) often provide access to a large number of streaming content items. Only a fraction of the streaming content items are of interest to a given user. Additionally, user interests will vary such that different streaming content items will be relevant to different users.

SUMMARY

Some aspects of the present technology relate to, among other things, systems, methods, and computer storage media that provide for content item retrieval that is personalized and time aware for a given user. Interaction tracking is performed to identify content items with which a user interacted and time data indicative of when the user interacted with each content item. Additional information, such as a type of user interaction or a category associated with a content item, can be tracked for each user interaction. A machine learning model is trained using content of the content items identified from the interaction tracking and the time data associated with each content item. In some configurations, a content item vector representation is generated for each content item, a time vector representation is generated for the time data associated with each content item, and the machine learning model is trained using the content item vector representations and the time vector representations. Once trained, the machine learning model is used to facilitate content item retrieval for the user. Given a number of target content items for possible presentation to the user, each target content item is inputted to the machine learning model, which determines a relevance score for each target content item. At least a portion of the target content items are provided for presentation to the user based on the relevance scores.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein:

FIG. 2 is a block diagram showing an example of information tracked for user interactions with a content items by a particular person in accordance with some implementations of the present disclosure;

DETAILED DESCRIPTION

Overview

Figure 1:
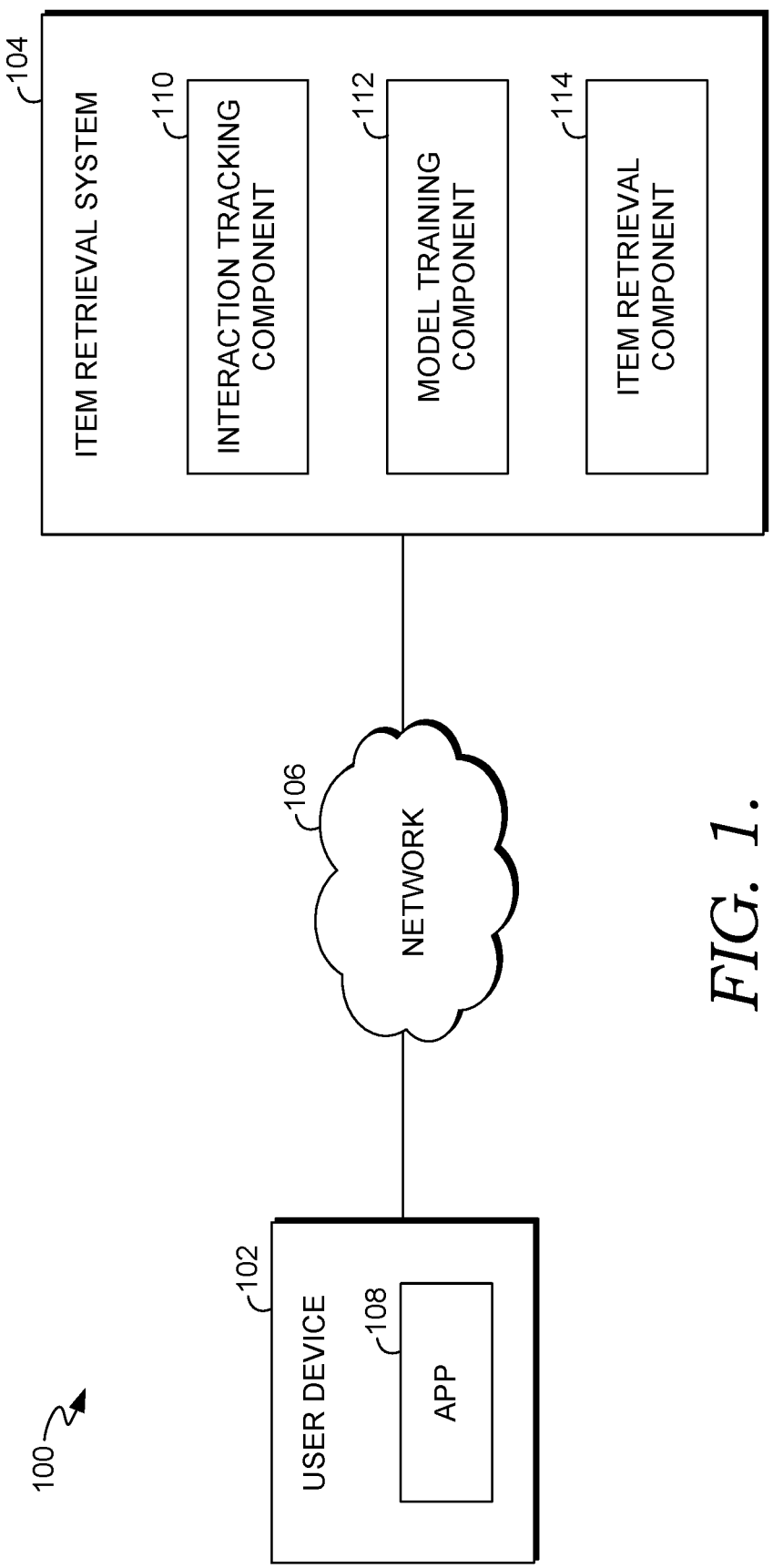
FIG. 1 is a block diagram illustrating an exemplary system in accordance with some implementations of the present disclosure.

Given the vast amount of content available to users, there are many scenarios where users have access to an overwhelming number of content items with much of the content not being relevant to each user. For instance, when a user visits a product page on an e-commerce site, there may be a large number of user reviews associated with the product. Some of the user reviews may be so generic that they are generally unhelpful (e.g., "great product"). Other times, user reviews will focus on features that are irrelevant to a particular user. For instance, a product page for a mobile device may include many user reviews discussing the screen resolution of the mobile device. If the user is only interested in the camera quality of the mobile device, these user reviews will be irrelevant to the user. As another example, streaming content services provide a wide range of content items. Typically, users are only interested in consuming a small fraction of the content available. Additionally, the content items that are relevant for a given user will differ from other users. Moreover, users' interests change over time such that while some content items may be relevant to a user at one time, other content items may be relevant to that user at another time. In some cases, content items can become stale or otherwise less relevant over time. For instance, in the context of user reviews, there are some cases in which a product manufactured in batches (e.g., chocolates, perfumes, safety seats, etc.) has a batch with a defect (e.g., the product may be recalled). Any user reviews provided for the product from that batch with the defect will not apply once the defect has been resolved.

In an attempt to address this issue, many content systems have developed tools that facilitate retrieving particular content items to assist users in finding relevant content. In some cases, systems provide tools that allow content items to be sorted or filtered. For instance, user reviews can often be sorted or filtered based on the review scores given to a product by each reviewer. As another example, streaming content, such as movies and music, can often be filtered based on genre. Many systems also provide search tools that allow users to search for content items by submitting queries.

While content discovery tools provided by current content systems facilitate item retrieval to a certain extent, shortcomings in existing technologies often result in the consumption of an unnecessary quantity of computing resources (e.g., I/O costs, network packet generation costs, throughput, memory consumption, etc.). For instance, filter/sorting tools still provide a large number of content items. This often requires sequentially pulling multiple pages of content items as the user sifts through the content items. While search is helpful, there are many times in which search systems fail to address the user intent of a search query. As a result, the content items retrieved as search results are not sufficiently relevant. Because the search result set does not include relevant content items, the user must submit additional search queries until the system finally returns desired content items. For example, a user may issue a first query to a search engine that returns a set of search results. The user may browse the search results and select certain search results to access the corresponding content items. Selection of content items causes retrieval of the content items from various content sources. Additionally, in some cases, applications supporting those content items are launched in order to render the content items. When the search results are not sufficiently relevant, the user must then repeat the process by submitting a new search query until desired search results are returned.

These repetitive inputs result in increased computing resource consumption, among other things. For instance, repetitive user queries result in packet generation costs that adversely affect computer network communications. Each time a user issues a query, the contents or payload of the query is typically supplemented with header information or other metadata within a packet in TCP/IP and other protocol networks. Accordingly, when this functionality is multiplied by all the inputs needed to obtain the desired data, there are throughput and latency costs by repetitively generating this metadata and sending it over a computer network. In some instances, these repetitive inputs (e.g., repetitive clicks, selections, or queries) increase storage device I/O (e.g., excess physical read/write head movements on non-volatile disk) because each time a user inputs unnecessary information, such as inputting several queries, the computing system often has to reach out to the storage device to perform a read or write operation, which is time consuming, error prone, and can eventually wear on components, such as a read/write head. Further, if users repetitively issue queries, it is expensive because processing queries consumes a lot of computing resources. For example, for some search engines, a query execution plan may need to be calculated each time a query is issued, which requires the system to find the least expensive query execution plan to fully execute the query. This decreases throughput and increases network latency, and can waste valuable time.

Aspects of the technology described herein improve the functioning of the computer itself in light of these shortcomings in existing search technologies by providing a solution that enables an item retrieval system to retrieve content items that are personalized and time aware for a given user.

In accordance with some aspects of the technology described herein, a user's interactions with content items are tracked, including identifying content items with which the user interacts and time data indicative of when the user interacted with each content item. In some configurations, additional information associated with each user interaction is also tracked, such as a type of user interaction or a category associated with each content item. The information from the user interactions is used to train a machine learning model. In particular, content from the content items with which the user interacted and time data indicative of when the user interacted with each content item is used to train a machine learning model to predict relevance of content items to the user. Additional information tracked for user interactions (e.g., type of user interaction, category, etc.) can also be used to train the machine learning model.

In some configurations, a content item vector representations is generated for each content item using content of the content item (e.g., using a neural-network based model, such as a Bidirectional Encoder Representation from Transformers (BERT) model). Additionally, in some configurations, a time vector representation is generated for time data associated with each content item (e.g., using a neural-network based model, such as a time2vec model). The content item vector representations and/or the time vector representations are then used to train the machine learning model to predict relevance scores. The machine learning model may be, for instance, a long short-term memory (LSTM) model, in which the model learns from sequences of data as opposed to discrete data points.

Once trained, the machine learning model is used for content item retrieval for the user. Given a number of target content items, the machine learning model generates a relevance score for each target content item. At least a portion of the target content items are provided for presentation to the user based on the relevance scores. For instance, the relevance scores can be used to select a top N target content items to include in a user interface for presentation to the user. Additionally or alternative, the relevance scores can be used to rank (i.e., order) target content items for presentation to the user.

Aspects of the technology described herein provide a number of improvements over existing search technologies. For instance, computing resource consumption is improved relative to existing technologies. In particular, the machine learning model is trained on content of content items with which the user has interacted, and as such, generates relevance scores for target content items that reflect likely relevance of each target content item to the user. Additionally, since the machine learning model is trained using time data, the machine learning model generates relevance scores that take into account the user's interests over time. The time data further facilitates lowering the relevance scores of content items that become less relevant over time (e.g., user reviews for a product from an older batch with a defect will have lower relevance scores). As a result, the machine learning model provides for improved content item retrieval. This eliminates (or at least reduces) the repetitive user filtering, user sorting, user queries, search result selections, and rendering of content items. Accordingly, aspects of the technology described herein decrease computing resource consumption, such as packet generation costs. For instance, a user query (e.g., an HTTP request), would only need to traverse a computer network once (or fewer times relative to existing technologies). Specifically, the contents or payload of the user query is supplemented with header information or other metadata within a packet in TCP/IP and other protocol networks once for the initial user query. Such packet for a user query is only sent over the network once or fewer times. Thus, there is no repetitive generation of metadata and continuous sending of packets over a computer network.

In like manner, aspects of the technology described herein improve storage device or disk I/O and query execution functionality, as they only need to go out to disk a single time (or fewer times relative to existing search technologies). As described above, the inadequacy of existing search technologies results in repetitive user filtering, user sorting, user queries, search result selections, and item renderings. This causes multiple traversals to disk. In contrast, aspects described herein reduce storage device I/O because the user provides only minimal inputs and so the computing system does not have to reach out to the storage device as often to perform a read or write operation. For example, the search engine can respond with search results that satisfy the user intent from a single user query (or few queries relative to existing technology). Accordingly, there is not as much wear on components, such as a read/write head, because disk I/O is substantially reduced.

Various configurations also improve query execution resource savings. Specifically, for example, the item retrieval system calculates a query execution plan on fewer queries relative to existing search technologies. This increases throughput and decreases network latency because aspects of the technology described herein do not have to repetitively calculate query execution plans because fewer user queries need to be executed, unlike existing search technologies.

Example System for Personalized Time Aware Item Retrieval

With reference now to the drawings, FIG. 1 is a block diagram illustrating an exemplary system 100 for providing personalized time aware item retrieval in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 and an item retrieval system 104. Each of the user device 102 and item retrieval system 104 shown in FIG. 1 can comprise one or more computer devices, such as the computing device 600 of FIG. 6, discussed below. As shown in FIG. 1, the user device 102 and the item retrieval system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and server devices may be employed within the system 100 within the scope of the present technology. Each may comprise a single device or multiple devices cooperating in a distributed environment. For instance, the item retrieval system 104 could be provided by multiple server devices collectively providing the functionality of the item retrieval system 104 as described herein. Additionally, other components not shown may also be included within the network environment.

The user device 102 can be a client device on the client-side of operating environment 100, while the item retrieval system 104 can be on the server-side of operating environment 100. The item retrieval system 104 can comprise server-side software designed to work in conjunction with client-side software on the user device 102 so as to implement any combination of the features and functionalities discussed in the present disclosure. For instance, the user device 102 can include an application 108 for interacting with the item retrieval system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the item retrieval system 104 remain as separate entities. While the operating environment 100 illustrates a configuration in a networked environment with a separate user device and item retrieval system, it should be understood that other configurations can be employed in which components are combined. For instance, in some configurations, a user device may also provide item retrieval capabilities.

The user device 102 may comprise any type of computing device capable of use by a user. For example, in one aspect, the user device may be the type of computing device 600 described in relation to FIG. 6 herein. By way of example and not limitation, the user device 102 may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user may be associated with the user device 102 and may interact with the item retrieval system 104 via the user device 102.

The item retrieval system 104 generally operates to use a machine learning model to predict relevance scores for content items for a given user and returns content items to the user based on the relevance scores. The machine learning model is trained on content items the user has interacted with and time data associated with when the user interacted with each of the content items. In this way, the relevance scores provide for item retrieval that is personalized and time aware for the particular user. As shown in FIG. 1, the item retrieval system 104 includes an interaction tracking component 110, a model training component 112, and an item retrieval component 114.

In some configurations, the item retrieval system 104 may be part of a listing platform. Examples of listing platforms include e-commerce platforms, in which listed products or services are available for purchase by a user of a client device upon navigation to the platforms. Other examples of listing platforms include rental platforms listing various items for rent (e.g., equipment, tools, real estate, vehicles, contract employees) and media platforms listing digital content items (e.g., content for download). The functionality of a listing platform includes provision of interfaces enabling surfacing of items to users of the listing platform. Each item may comprise a listing of a product/service available for sale/rent via the listing platform. Each item may include a description comprising one or more of a price in a currency, reviews, images of the item, shipment options, a rating, a condition of the item, a size of the item, a color of the item, etc. In aspects, each item is associated with one or more categories including meta-categories and leaf categories. For example, the meta-categories are each divisible into subcategories (or branch categories), whereas leaf categories are not divisible. While a listing platform is provided as one example of an environment in which the item retrieval system 104 may be provided, it should be understood that the technology described herein can be employed in other contexts.

The components of the item retrieval system 104 may be in addition to other components that provide further additional functions beyond the features described herein. The item retrieval system 104 can be implemented using one or more server devices, one or more platforms with corresponding application programming interfaces, cloud infrastructure, and the like. While the item retrieval system 104 is shown separate from the user device 102 in the configuration of FIG. 1, it should be understood that in other configurations, some or all of the functions of the item retrieval system 104 can be provided on the user device 102.

In one aspect, the functions performed by components of the item retrieval system 104 are associated with one or more personal assistant applications, services, or routines. In particular, such applications, services, or routines may operate on one or more user devices, servers, may be distributed across one or more user devices and servers, or be implemented in the cloud. Moreover, in some aspects, these components of the item retrieval system 104 may be distributed across a network, including one or more servers and client devices, in the cloud, and/or may reside on a user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

The interaction tracking component 110 of the item retrieval system 104 tracks a user's interactions with content items. In different configurations of the technology described herein, the interaction tracking component 110 can track a variety of different types of user interactions with content items. By way of example only and not limitation, the interaction tacking component 110 can track user interactions such as a user viewing a content item, rating a content item, liking a content item, marking a content item as helpful, or a length of time with which a user views a content item. The type of user interaction tracked can also depend on the type of content item. For instance, in the context of user reviews on item pages, tracked user interactions could include the user viewing a user review, selecting to view an image or video of a user review, or marking a user review as helpful. As another example, in the context of an item page for a product available via a listing platform, the user interactions could include, for instance, the user viewing the item page for the product, rating the product, adding the product to a cart, adding the product to a wish list, or purchasing the product. As a further example, in the context of digital content (e.g., movies, videos, music, etc.), the user interactions could include, for instance, the user viewing an item page for the digital content, consuming the digital content (e.g., watching a movie), or rating the digital content.

In addition to identifying user interactions with content items, the interaction tracking component 110 tracks a time at which the user interacted with each content item. For instance, the interaction tracking component 110 can store a timestamp indicating when a user interaction with a given content item occurred. The granularity of the timestamp can vary in different embodiments. For instance, the timestamp could reflect a time of day, day, month, year, and/or season when the user interacted with the content item.

The interaction tracking component 110 can track additional information associated with user interactions beyond the content item, the type of user interaction, and a time of the user action. For instance, in some configurations, the interaction tracking component 110 records additional information associated with a content item, such as a category for a content item. For instance, in the context of user reviews, the interaction tracking component 110 could associate a category of the item on which the user review was provided. As an example, if a user interacted with a user review for a laptop, a category such as "laptops" or "computers" could be associated with the user interaction. As another example, in the context of digital content, a category of the digital content with which the user interacted could be tracked. For instance, if the user viewed a drama movie, a category such as "drama" could be associated with the user interaction.

FIG. 2 provides an example of information regarding user interactions with content items tracked by the interaction tracking component 110. Each row corresponds with a user interaction with a content item by a particular user. As shown in FIG. 2, the information tracked for each user interaction includes the content item 202. The present example is in the context of user reviews. As such, each content item 202 corresponds with text of a user review. The information tracked also includes an interaction type 204. For instance, each user review was either marked as helpful by the user or simply viewed by the user. The information tracked further includes an interaction time 206 indicating when the user interacted with the content item. In the present example, a date when the user interacted with each user review is identified. The information tracked still further includes an indication of the category 208 associated with the content item. In the present example, an indication is provided of the category of the product on which the user review was provided.

Referring again to FIG. 1, the model training component 112 uses the user interaction data tracked by the interaction tracking component 110 to train a machine learning model (e.g., a neural network) to score content items for item retrieval. In some configurations, the model training component 112 trains a neural network, such as a long short-term memory (LSTM) network, using at least content from content items with which the user has interacted and time data indicating when the user interacted with each content item. A LSTM network is a type of recurrent neural network (RNN) that can learn from sequences of data, as opposed to discrete data points.

In accordance with some aspects, the model training component 112 generates vector representations of content items (referred to herein as content item vector representations) and vector representations of time data associated with the content items (referred to herein as time vector representations). For instance, in some configurations, a neural network-based machine learning model, such as a Bidirectional Encoder Representation from Transformers (BERT) model, is employed to generate content item vector representations. Given text from a content item, the machine learning model generates a content item vector representation for the content item. In some configurations, a neural network-based machine learning model, such as the time2vec model, is employed to generate time vector representations. Given time data indicative of a time at which the user interacted with a content item, the machine learning model generates a time vector representation.

The model training component 112 can use the content item vector representations and associated time vector representations to train a machine learning model to predict content items relevant to the user. As noted above, the machine learning model can comprise, for instance, a LSTM network, that can learn from sequences of data such that the machine learning model not only learns from content items with which the user has interacted but also when the user interacted with each content item. By training the machine learning model using content items with which the user has interacted, the machine learning model can identify content items relevant to the user thereby providing for personalized item retrieval. Additionally, by training the machine learning model using time data indicating when the user interacted with each content item, the item identification by the machine learning model is time-aware such that the content items are not only relevant to the user generally, but also take into account timing information that further facilitates identifying content items for retrieval that are most likely currently relevant to the user.

Figure 3:
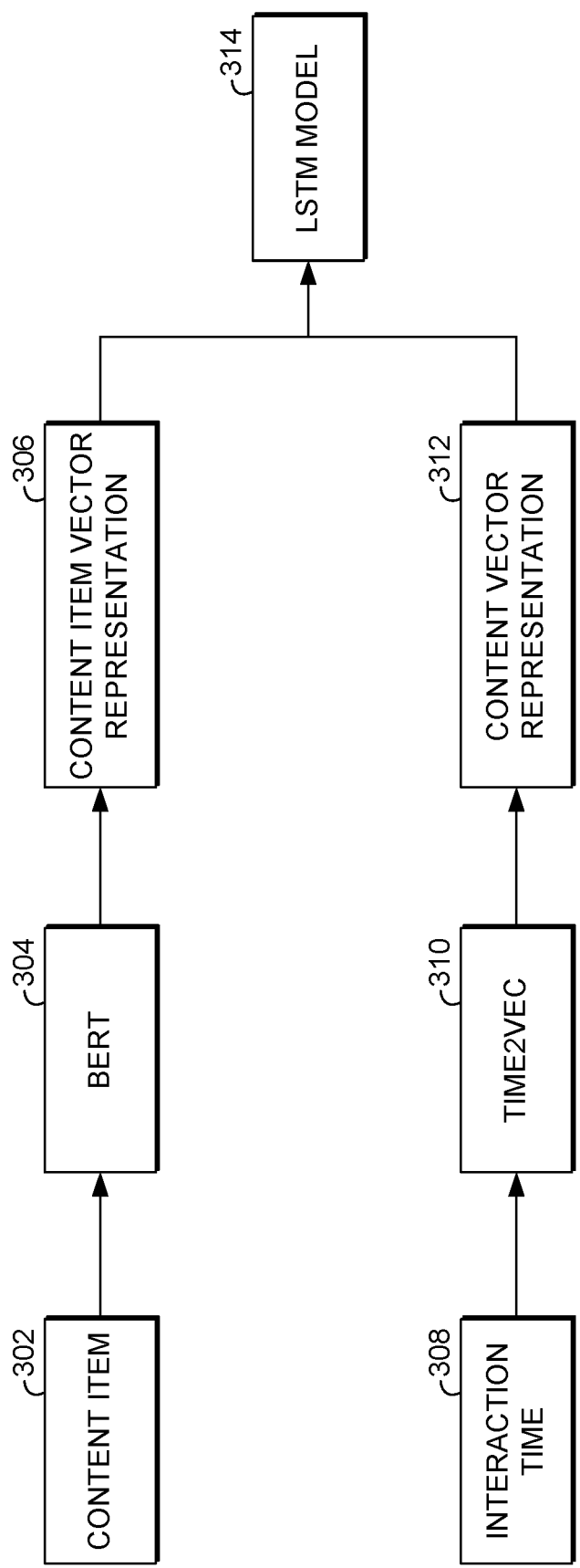
FIG. 3 is a block diagram illustrating an example process for training a machine learning model to predict relevance scores for content items in accordance with some implementations of the present disclosure.

FIG. 3 provides a block diagram illustrating training of an LSTM model in accordance with some aspects of the technology described herein. As shown in FIG. 3, a content item 302 is processed by a BERT model 304 to generate a content item vector representation 306. Additionally, an interaction time 308 (i.e., indicating when the user interacted with the content time 302) is processed by a time2vec model 310 to generate a time vector representation 312. The content item vector representation 306 and time vector representation 312 are provided as training data to train an LSTM model 314. While FIG. 3 shows generation and use of a content item vector representation and associated time vector representation for a single content item, in practice, content item vector representations and associated time vector representations are generated for multiple content items and are then used to train a model, such as an LSTM model.

Additional information beyond content and time data of content items can be used when training a machine learning model to predict time-aware content relevant to a user. For instance, in some configurations, the model training component 112 can use category information associated with each content item when training the machine learning model. This could be done, for example, by concatenating the category information with content from a content item when generating a content item vector representation. Including category information allows the machine learning model to learn aspects relevant to different categories of items. For instance, screen size may be important to a user for televisions but not relevant to the user for mobile phones. In further embodiments, different machine learning models can be generated for different categories. For instance, content items for a particular category can be identified and used to train a machine learning model for that category.

In some configurations, the model training component 112 can use the different types of user interactions when training the machine learning model. In particular, different types of user interactions can be weighted differently. The weights may reflect a likelihood that the content item is relevant to the user. For instance, a user interaction in which a user marked a user review as helpful may be given greater weight than a user interaction in which the user simply viewed a user review. As another example, a user interaction in which a user consumed a streaming content item may be given greater weight than a user interaction in which the user only reviewed a description of a streaming content item.

Once a machine learning model has been trained by the model training component 112, the machine learning model can be used by the item retrieval component 114 to retrieve content items for the user. The item retrieval component 114 provides a content item as input to the machine learning model, which returns a relevance score for the content item. In this way, a relevance score is generated for each of a number of content items. The relevance scores are used by the item retrieval component 114 to determine which content items to provide to the user and/or an order of the content items. For instance, in the context of user reviews associated with an item page, a relevance score can be generated for each user review, and the item retrieval component 114 can select which users reviews to include on the item page and/or an order with which the user reviews are presented on the item page. As another example, search results for content items returned in response to a search query can be ranked at least in part based on the relevance scores from the machine learning model. As a further example, recommendations for content items for presentation to the user can be selected at least in part based on the relevance scores from the machine learning model.

Example Methods for Personalized Time Aware Item Retrieval

Figure 4:
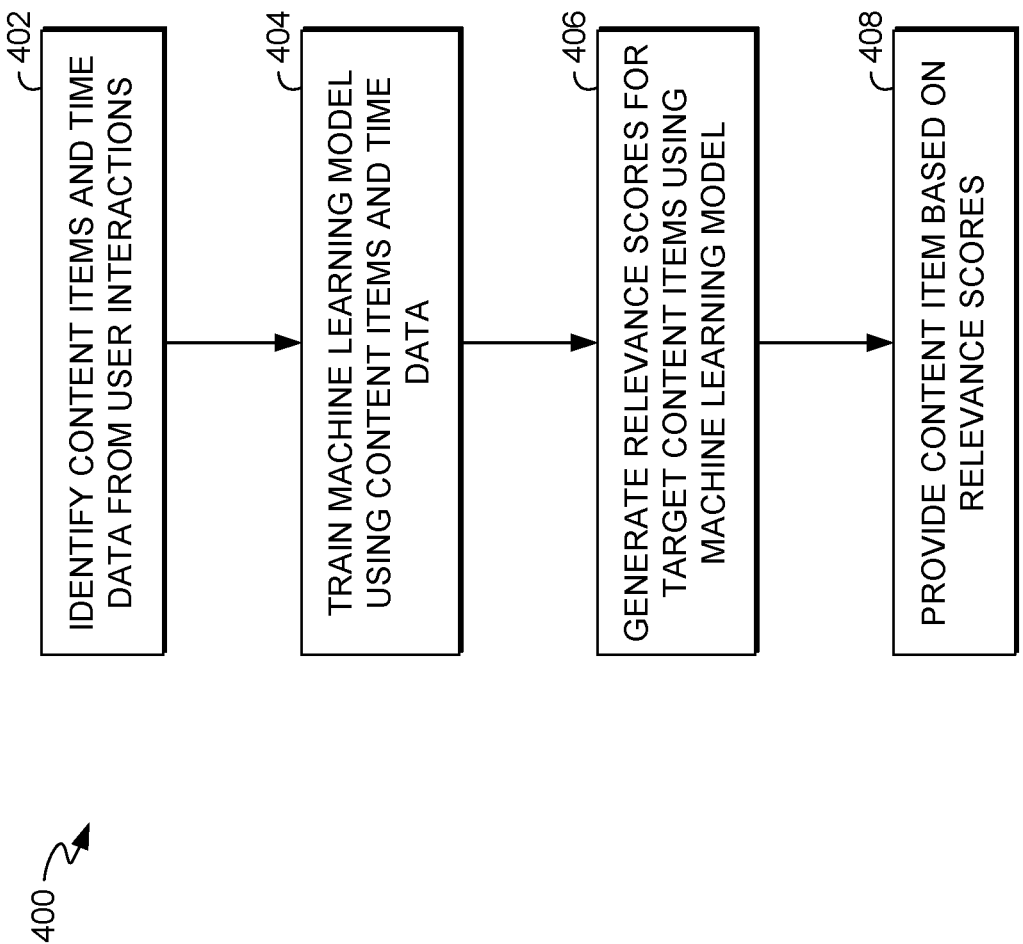
FIG. 4 is a flow diagram showing a method for content item retrieval that is personalized and time aware for a user based on the user's interactions with content items in accordance with some implementations of the present disclosure.

With reference now to FIG. 4, a flow diagram is provided that illustrates a method 400 for content item retrieval that is personalized and time aware for a user based on the user's interactions with content items. The method 400 may be performed, for instance, by the item retrieval system 104 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, content items and time data are identified from user interactions by a particular user. In particular, content items with which a user has interacted are identified (e.g., by the interaction tracking component 110 of FIG. 1). Additionally, time data indicating when the user interacted with each content item is identified. Further information associated with each user interaction can also be identified, such as, for instance, a type of user interaction and/or a category of product/service associated with the content time.

A machine learning model is trained (e.g., by the model training component 112 of FIG. 1) using the content items and the time data from the user interactions, as shown at block 404. One approach for training a machine learning model is described below with reference to FIG. 5. In some instances, the machine learning model is an LSTM model that can learn from sequences of data, as opposed to discrete data points, thereby leveraging the time data in association with content items. Additional information, such as type of user interaction and/or category of product/service associated with each content item, can also be used to train the machine learning model.

When target content items are to be retrieved for presentation to the user, relevance scores for the target content items are generated using the machine learning model, as shown at block 406. Each target content item is provided as input to the machine learning model, which predicts a relevance score for each target content item. This may comprises generating a vector representation of a target content item (e.g., using a BERT model) and providing the vector representation of the target content item to the machine learning model. Time data, such as a current date on which the item retrieval is being performed, can be provided as input to the machine learning model. In some cases, additional information associated with each target content item, such as for instance, a category associated with each target content item, can be provided to the model for use in generating the relevance scores.

Target content items are provided to the user based on the relevance scores, as shown at block 408. This may include selecting an N number of target content items to return based on the target content items having higher relevance scores. This may alternatively or additionally include ranking (i.e., ordering) target content items for presentation to the user based on the relevance scores.

Figure 5:
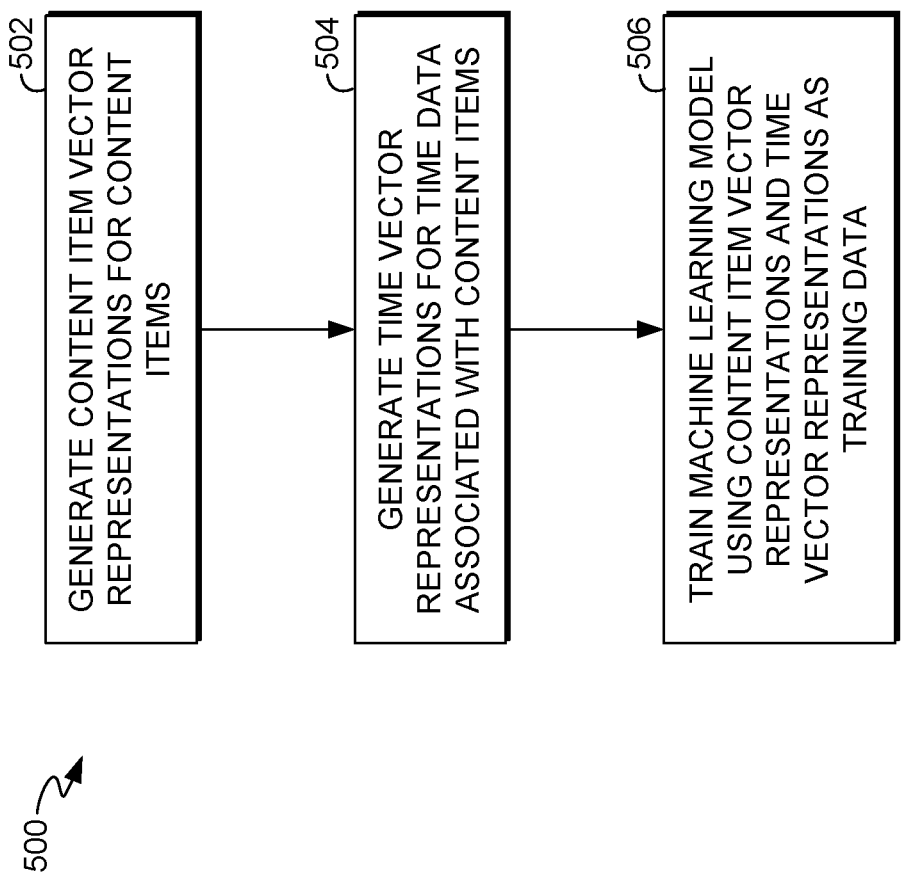
FIG. 5 is a flow diagram showing a method for training a machine learning model using information from user interactions by a particular user in accordance with some implementations of the present disclosure.

FIG. 5 provides a flow diagram showing a method 500 for training a machine learning model using information from user interactions by a particular user. As shown at block 502, content item vector representations are generated for content items with which the user has interacted. For instance, each content item vector representation can be generated by providing a content item to a machine learning model, such a BERT model. Additionally, time vector representations are generated for time data associated with the content items, as shown at block 504. For instance, each time vector representation can be generated by providing time data associated with a user interaction with a content item to a machine learning model, such as a time2vec model.

As shown at block 506, a machine learning model is trained using the content item vector representations and the time vector representations as training data. In some instances, the machine learning model is an LSTM model that can learn from sequences of data. Each time vector representation is associated with its corresponding content item vector representation such that the vector representations are processed by the LSTM model in a sequential manner to learn not only from the content of the content items, but also the time data associated with when the user interacted with each content item.

Exemplary Operating Environment

Figure 6:
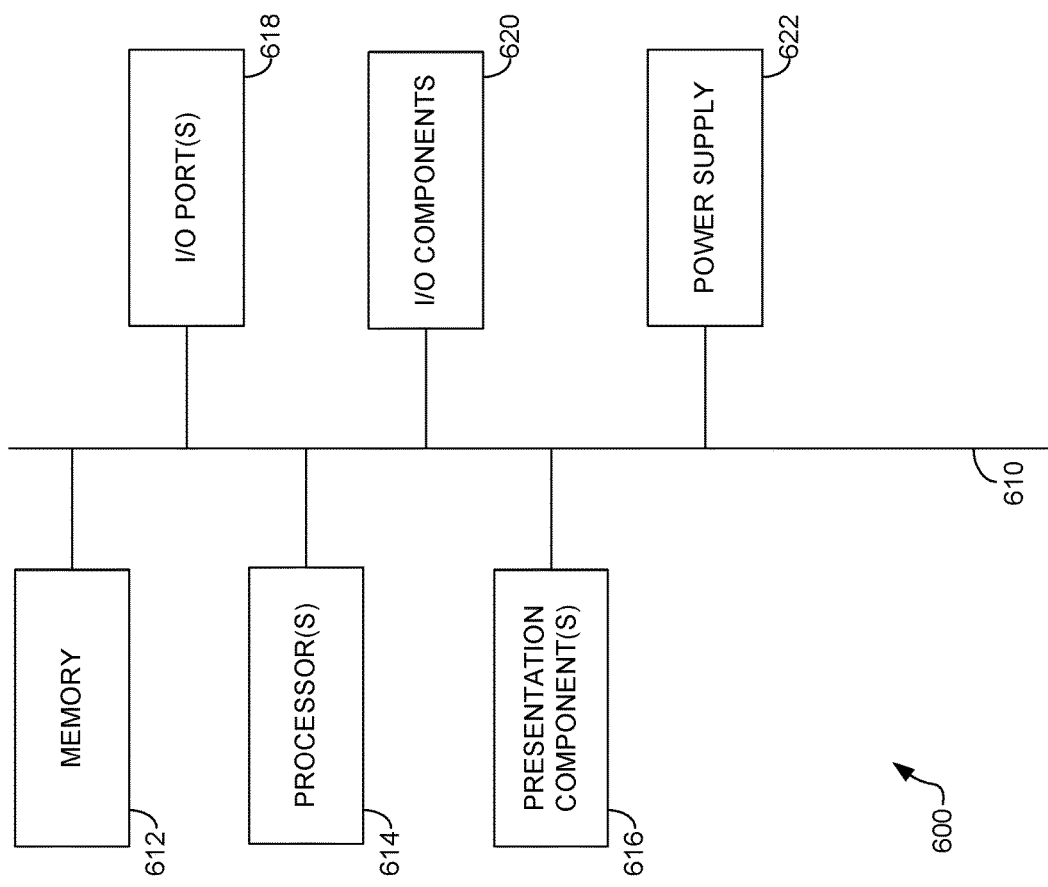
FIG. 6 is a block diagram of an exemplary computing environment suitable for use in implementations of the present disclosure.

Having described implementations of the present disclosure, an exemplary operating environment in which embodiments of the present technology may be implemented is described below in order to provide a general context for various aspects of the present disclosure. Referring initially to FIG. 6 in particular, an exemplary operating environment for implementing embodiments of the present technology is shown and designated generally as computing device 600. Computing device 600 is but one example of a suitable computing environment and is not intended to suggest any limitation as to the scope of use or functionality of the technology. Neither should the computing device 600 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present technology. Distinction is not made between such categories as "workstation," "server," "laptop," "handheld device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
    identifying a plurality of content items with which a user has interacted and a time stamp for each content item indicative of when the user interacted with the content item;
    training a machine learning model using the content items and the time stamp for each content item to generate a trained machine learning model;
    generating, using the trained machine learning model, a relevance score for each target content item from a plurality of target content items, the relevance score for each target content item indicative of a relevance of the target content item to the user; and providing, for presentation on a user device of the user, at least a portion of the target content items based on the relevance scores.

2. The computer-implemented method of claim 1, wherein the plurality of content items are identified based at least in part on a category associated with each of the content items.

3. The computer-implemented method of claim 1, wherein training the machine learning model using the content items and the time stamp for each content item comprises:
   generating a content item vector representation for each content item; and
   training the machine learning model using the content item vector representations.

4. The computer-implemented method of claim 3, wherein the content item vector representation for a first content item is generated using text of the first content item.

5. The computer-implemented method of claim 3, wherein training the machine learning model using the content items and the time stamp for each content item further comprises:
   generating a time vector representation for the time stamp for each content item; and
   training the machine learning model using the time vector representations.

6. The computer-implemented method of claim 1, wherein generating the relevance score for a first target content item from the plurality of target content items comprises:
   generating a vector representation of the first target content item; and
   using the trained machine learning model to predict the relevance score for the first target content item using the vector representation of the first target content item.

7. The computer-implemented method of claim 6, wherein the trained machine learning model predicts the relevance score for the first target content item based on time data associated with the first target content item.

8. One or more computer storage media storing computer-useable instructions that, when used by a computing device, cause the computing device to perform operations, the operations comprising:
   identifying a plurality of content items with which a user has interacted and a time stamp for each content item indicative of when the user interacted with the content item;
   training a machine learning model using the content items and the time stamp for each content item to generate a trained machine learning model;
   generating, using the trained machine learning model, a relevance score for each target content item from a plurality of target content items, the relevance score for each target content item indicative of a relevance of the target content item to the user; and
   providing, for presentation on a user device of the user, at least a portion of the target content items based on the relevance scores.

9. The one or more computer storage media of claim 8, wherein the plurality of content items are identified based at least in part on a category associated with each of the content items.

10. The one or more computer storage media of claim 8, wherein training the machine learning model using the content items and the time stamp for each content item comprises:
    generating a content item vector representation for each content item; and
    training the machine learning model using the content item vector representations.

11. The one or more computer storage media of claim 10, wherein the content item vector representation for a first content item is generated using text of the first content item.

12. The one or more computer storage media of claim 10, wherein training the machine learning model using the content items and the time stamp for each content item further comprises:
    generating a time vector representation for the time stamp for each content item; and
    training the machine learning model using the time vector representations.

13. The one or more computer storage media of claim 8, wherein generating the relevance score for a first target content item from the plurality of target content items comprises:
    generating a vector representation of the first target content item; and
    using the trained machine learning model to predict the relevance score for the first target content item using the vector representation of the first target content item.

14. The one or more computer storage media of claim 13, wherein the trained machine learning model predicts the relevance score for the first target content item based on time data associated with the first target content item.

15. A computer system comprising:
    a processor; and
    a computer storage medium storing computer-useable instructions that, when used by the processor, causes the computer system to perform operations comprising:
    identifying a plurality of content items with which a user has interacted and a time stamp for each content item indicative of when the user interacted with the content item;
    training a machine learning model using the content items and the time stamp for each content item to generate a trained machine learning model;
    generating, using the trained machine learning model, a relevance score for each target content item from a plurality of target content items, the relevance score for each target content item indicative of a relevance of the target content item to the user; and
    providing, for presentation on a user device of the user, at least a portion of the target content items based on the relevance scores.

16. The computer system of claim 15, wherein the plurality of content items are identified based at least in part on a category associated with each of the content items.

17. The computer system of claim 15, wherein training the machine learning model using the content items and the time stamp for each content item comprises:
    generating a content item vector representation for each content item; and
    training the machine learning model using the content item vector representations.

18. The computer system of claim 17, wherein the content item vector representation for a first content item is generated using text of the first content item.

19. The computer system of claim 17, wherein training the machine learning model using the content items and the time stamp for each content item further comprises:
    generating a time vector representation for the time stamp for each content item; and training the machine learning model using the time vector representations.

20. The computer system of claim 15, wherein generating the relevance score for a first target content item from the plurality of target content items comprises:
generating a vector representation of the first target content item; and
using the trained machine learning model to predict the relevance score for the first target content item using the vector representation of the first target content item.

* * * * *